(12) United States Patent
Huangfu et al.

(10) Patent No.: US 10,185,085 B2
(45) Date of Patent: Jan. 22, 2019

(54) ON-CHIP OPTICAL INTERCONNECTION STRUCTURE AND NETWORK

(71) Applicant: Huawei Technologies Co., Ltd., Shenzhen (CN)

(72) Inventors: Yourui Huangfu, Hangzhou (CN); Shaoqing Liu, Beijing (CN); Yingchun Yang, Hangzhou (CN); Chen Qiu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/839,422

(22) Filed: Dec. 12, 2017

(65) Prior Publication Data

US 2018/0100965 A1   Apr. 12, 2018

Related U.S. Application Data

(63) Continuation of application No. PCT/CN2015/081344, filed on Jun. 12, 2015.

(51) Int. Cl.
*G02B 6/122* (2006.01)
*G02B 6/26* (2006.01)
(Continued)

(52) U.S. Cl.
CPC .............. *G02B 6/122* (2013.01); *G02B 6/26* (2013.01); *G02B 6/3546* (2013.01); *G02B 6/43* (2013.01);
(Continued)

(58) Field of Classification Search
CPC ......... G02B 6/122; G02B 6/26; H04B 10/803
See application file for complete search history.

(56) References Cited

U.S. PATENT DOCUMENTS 5,351,146 A   9/1994   Chan et al.
5,532,856 A   7/1996   Li et al.
(Continued)

FOREIGN PATENT DOCUMENTS

CN   103091784 A   5/2013
CN   103248578 A   8/2013
(Continued)

OTHER PUBLICATIONS

Jeang, Y., et al., "An Adaptive Routing Algorithm for Mesh-Tree Architecture in Network-on-Chip Designs," XP031341494, 3rd International Conference on Innovative Computing Information and Control, Jun. 18, 2008, 4 pages.
(Continued)

*Primary Examiner* — Sung H Pak
(74) *Attorney, Agent, or Firm* — Conley Rose, P.C.

(57) ABSTRACT

An on-chip optical interconnection structure and network, where the on-chip optical interconnection structure includes M levels of optical switches, and $m^{th}$-level optical switches in the M levels of optical switching devices include $2^{m-1}$ optical switches. Each optical switch in $(i-1)^{th}$-level optical switches in the M levels of optical switches is coupled to two optical switches in $i^{th}$-level optical switches. Two optical switches in the $i^{th}$-level optical switches coupled to a same optical switch in the $(i-1)^{th}$-level optical switches are coupled. The on-chip optical interconnection network is divided into levels, and switches coupled in a grid manner are formed such that hierarchical switching may be performed, and conflicts and delays in communication are reduced.

15 Claims, 4 Drawing Sheets

(51) Int. Cl.
*G02B 6/35* (2006.01)
*G02B 6/43* (2006.01)
*H04B 10/80* (2013.01)
*H04Q 11/00* (2006.01)

(52) U.S. Cl.
CPC ....... *H04B 10/803* (2013.01); *H04Q 11/0005* (2013.01)

(56) References Cited

U.S. PATENT DOCUMENTS

| | | | | |
|---|---|---|---|---|
| 7,184,444 | B2* | 2/2007 | Posey, Jr. | H04L 45/00 370/416 |
| 7,593,637 | B2* | 9/2009 | Chiu | H04B 10/2972 398/45 |
| 7,627,245 | B2* | 12/2009 | Jenkins | H04J 14/0204 398/57 |
| 7,676,156 | B2* | 3/2010 | Wellen | H04J 14/0227 398/69 |
| 7,769,290 | B2* | 8/2010 | Smith | H04J 14/02 370/352 |
| 8,086,103 | B2* | 12/2011 | Beacken | H04Q 11/0062 398/69 |
| 8,285,789 | B2 | 10/2012 | Abts et al. | |
| 2005/0157974 | A1 | 7/2005 | Scherer | |
| 2009/0070549 | A1 | 3/2009 | Solomon | |
| 2012/0144064 | A1 | 6/2012 | Parker et al. | |

FOREIGN PATENT DOCUMENTS

| | | | |
|---|---|---|---|
| CN | 103369415 A | 10/2013 | |
| CN | 103941336 A | 7/2014 | |

OTHER PUBLICATIONS

Gu, H., et al., "A Low-Power Fat Tree-based Optical Network-on-Chip for Multiprocessor System-on-Chip," XP058086699, Design, Automation and Test in Europe, Apr. 20, 2009, 6 pages.
Foreign Communication From a Counterpart Application, European Application No. 15894657.4, Extended European Search Report dated Jun. 6, 2018, 4 pages.
Machine Translation and Abstract of Chinese Publication No. CN103248578, Aug. 14, 2013, 14 pages.
Machine Translation and Abstract of Chinese Publication No. CN103369415, Oct. 23, 2013, 10 pages.
Machine Translation and Abstract of Chinese Publication No. CN103941336, Jul. 23, 2014, 17 pages.
Foreign Communication From a Counterpart Application, PCT Application No. PCT/CN2015/081344, English Translation of International Search Report dated Feb. 26, 2016, 2 pages.
Foreign Communication From a Counterpart Application, PCT Application No. PCT/CN2015/081344, English Translation of Written Opinion dated Feb. 26, 2016, 6 pages.
Machine Translation and Abstract of Chinese Publication CN103091784A, Jan. 29, 2013, 9 pages.
Foreign Communication From a Counterpart Application, Chinese Application No. 201580001132.9, Office Action dated Oct. 29, 2018 3 pages.
Foreign Communication From a Counterpart Application, Chinese Application No. 201580001132.9, Search Repoort dated Oct. 29, 2018 2 pages.

* cited by examiner

ON-CHIP OPTICAL INTERCONNECTION STRUCTURE AND NETWORK

CROSS-REFERENCE TO RELATED APPLICATIONS

This application is a continuation of International Patent Application PCT/CN2015/081344 filed on Jun. 12, 2015, which is hereby incorporated by reference in its entirety.

TECHNICAL FIELD

The present disclosure relates to the communications field, and in particular, to an on-chip optical interconnection structure and network.

BACKGROUND

To meet requirements of a growing communications bandwidth and to reduce power consumption of a data center, a new interconnection mode having a higher throughput, a lower delay, and lower power consumption needs to be developed. Light provides a higher bandwidth density and lower power consumption. In addition, a silicon photonic technology may be compatible with a conventional Complementary Metal Oxide Semiconductor (CMOS) technique such that input and output of light may become interfaces of various computer components, such as an optical connection memory. In some existing optical interconnection technologies, computer components are interconnected in a form of a point-to-point optical fiber or waveguide. Data exchange is completed in an electrical domain, but this needs electrical-to-optical and optical-to-electrical conversion. The conversion process results in a lot of energy consumption, and causes adverse impact on a throughput and a delay of a network.

In addition, in an on-chip interconnection architecture, communication between processors is generally completed by multiple levels of switching devices cooperatively. This results in a relatively slow speed, and increases a delay in the communication. In addition, a switching device at any level may affect a communications process of the entire on-chip interconnection architecture, and a conflict and delay in the communication may easily occur.

SUMMARY

The present disclosure provides an on-chip optical interconnection structure and network in order to reduce power consumption, conflicts, and delays in communication.

According to a first aspect, an on-chip optical interconnection structure is provided, where the on-chip optical interconnection structure includes M levels of optical switching devices, $m^{th}$-level optical switching devices in the M levels of optical switching devices include $2^{m-1}$ optical switching devices, each optical switching device in $(i-1)^{th}$-level optical switching devices in the M levels of optical switching devices is connected to two optical switching devices in $i^{th}$-level optical switching devices, and two optical switching devices that are in the $i^{th}$-level optical switching devices and that are connected to a same optical switching device in the $(i-1)^{th}$-level optical switching devices are connected, where M, m, and i are integers, $M \geq 3$, $1 \leq m \leq M$, and $3 \leq i \leq M$.

With reference to the first aspect, in an implementation manner of the first aspect, at least one optical switching device in the M levels of optical switching devices is connected to a computer component using a transmission port.

With reference to the first aspect and the foregoing implementation manner, in another implementation manner of the first aspect, the on-chip optical interconnection structure further includes a control module, and the control module is configured to control a status of each optical switching device in the on-chip optical interconnection structure according to information obtained from the computer component.

With reference to the first aspect and the foregoing implementation manner thereof, in another implementation manner of the first aspect, a structure of each optical switching device in the on-chip optical interconnection structure is a microring resonant cavity structure or a Mach Zehnder interferometer (MZI) structure.

With reference to the first aspect and the foregoing implementation manners thereof, in another implementation manner of the first aspect, M=3, each optical switching device in the on-chip optical interconnection structure includes four transmission ports, and at least one of the four transmission ports of each optical switching device is connected to the computer component or the optical switching device.

According to a second aspect, an on-chip optical interconnection network is provided. The on-chip optical interconnection network includes at least one on-chip optical interconnection structure, where each of the at least one on-chip optical interconnection structure is the on-chip optical interconnection structure according to any one of claims 1 to 5.

With reference to the second aspect, in an implementation manner of the second aspect, when the on-chip optical interconnection network includes at least two on-chip optical interconnection structures, the at least two on-chip optical interconnection structures are connected to each other using a first-level optical switching device in each of the at least two on-chip optical interconnection structures.

Based on the foregoing technical solutions, embodiments of the present disclosure provide an on-chip optical interconnection structure and network. The on-chip optical interconnection network includes at least one on-chip optical interconnection structure. The on-chip optical interconnection structure may be a mesh-tree structure. Each mesh-tree structure includes multiple levels of optical switching devices, and two lower-level optical switching devices connected to a same upper-level optical switching device are also connected. Compared with conventional optoelectronic switching, all-optical switching of the on-chip optical interconnection network may reduce power consumption. The on-chip optical interconnection network is divided into levels, and optical switching devices connected in a grid manner are formed such that hierarchical switching may be performed, and conflicts and delays in communication are reduced. In addition, optical switching devices at a bottom layer of the mesh-tree structure allow faster and more effective communication between computer components without accessing an optical switching device at a higher layer. An optical switching device at a top layer of the mesh-tree structure may enable different types of off-chip memory elements to connect to more modules in a more flexible manner without interrupting data transmission between other layers.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
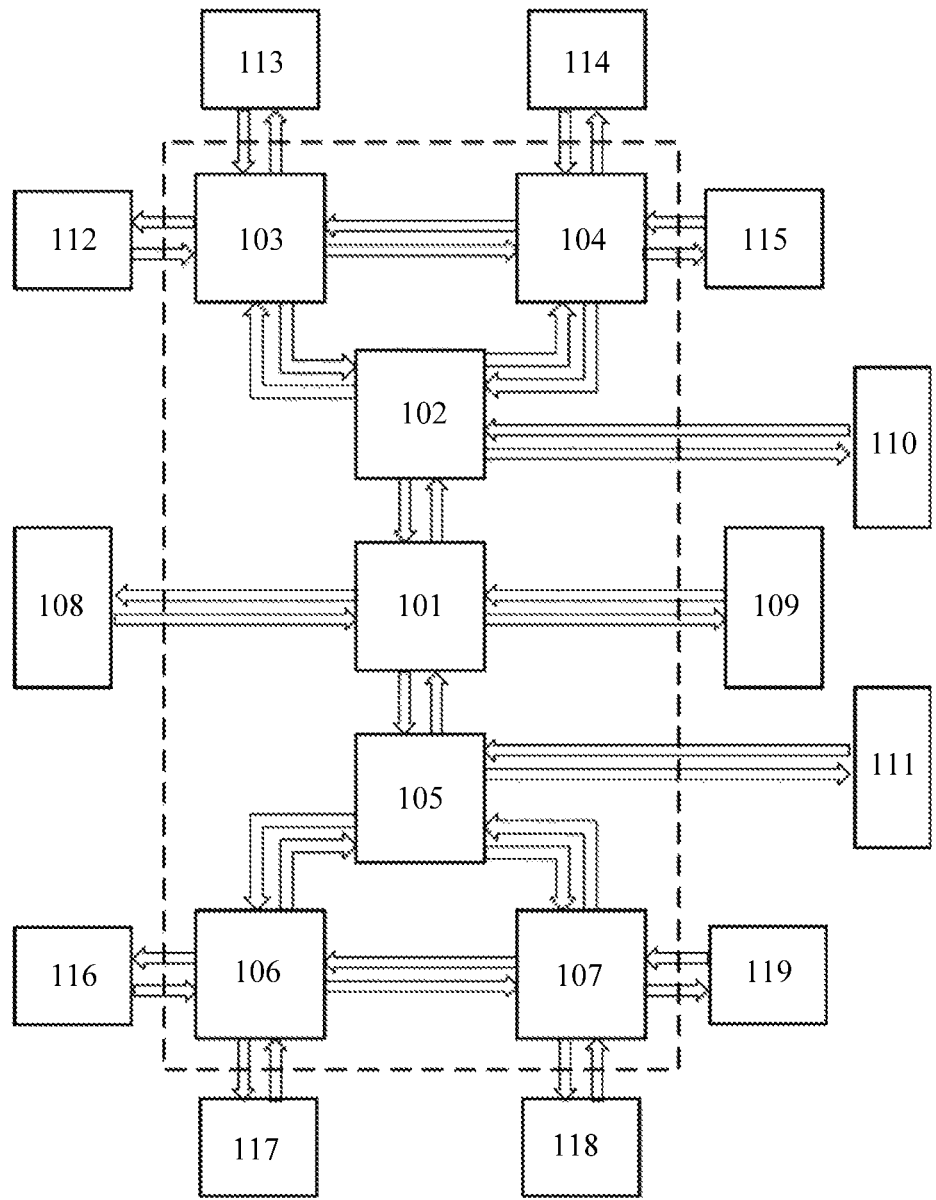
FIG. 1 is a schematic diagram of an on-chip optical interconnection network according to an embodiment of the present disclosure.

FIG. 1 is a schematic block diagram of an on-chip optical interconnection network according to an embodiment of the present disclosure. The on-chip optical interconnection network may include at least one on-chip optical interconnection structure. A dashed-line block in FIG. 1 shows a schematic diagram of any one on-chip optical interconnection structure.

For each on-chip optical interconnection structure in the on-chip optical interconnection network, each on-chip optical interconnection structure may include M levels of optical switching devices, where M≥3, and $m^{th}$-level optical switching devices in the M levels of optical switching devices include at most $2^{m-1}$ optical switching devices, where 1≤m≤M. Each optical switching device in $(i-1)^{th}$-level optical switching devices in the M levels of optical switching devices is connected to at most two optical switching devices in $i^{th}$-level optical switching devices. Two optical switching devices that are in the $i^{th}$-level optical switching devices and that are connected to a same optical switching device in the $(i-1)^{th}$-level optical switching devices are connected, where 3≤i≤M. M, m, and i are integers.

In this embodiment of the present disclosure, each optical switching device may include n transmission ports. The transmission ports may be used to perform input and output. Optionally, each of the transmission ports may include one input end and one output end, where n is a positive integer and n≥2. As shown in FIG. 1, each optical switching device includes four transmission ports, that is, n=4, and a connection between each optical switching device and another optical switching device means that at least one transmission port of the optical switching device is connected to a transmission port of the other optical switching device.

Optionally, in addition to being connected to another optical switching device, each optical switching device in the on-chip optical interconnection structure may also be connected to a computer component. At least one transmission port of at least one optical switching device in the on-chip optical interconnection structure may be connected to the computer component.

Therefore, this embodiment of the present disclosure provides an on-chip optical interconnection structure and network. The on-chip optical interconnection network includes at least one on-chip optical interconnection structure. The on-chip optical interconnection structure may be a mesh-tree structure. Each mesh-tree structure includes multiple levels of optical switching devices, and two lower-level optical switching devices connected to a same upper-level optical switching device are also connected. Compared with conventional optoelectronic switching, all-optical switching of the on-chip optical interconnection network may reduce power consumption. The on-chip optical interconnection network is divided into levels, optical switching devices connected in a grid manner are formed such that hierarchical switching may be performed, and conflicts and delays in communication are reduced. In addition, optical switching devices at a bottom layer of the mesh-tree structure allow faster and more effective communication between computer components without accessing an optical switching device at a higher layer. An optical switching device at a top layer of the mesh-tree structure may enable different types of computer components to connect to more modules in a more flexible manner without interrupting data transmission between other layers.

In an embodiment of the present disclosure, an on-chip optical interconnection network may include at least one on-chip optical interconnection structure. Each on-chip optical interconnection structure may be considered as a mesh-tree structure. Each on-chip optical interconnection structure, that is, each mesh-tree structure, may include M levels of optical switching devices, where M≥3, and $m^{th}$-level optical switching devices in the M levels of optical switching devices include at most $2^{m-1}$ optical switching devices, where 1≤m≤M. Each optical switching device in $(i-1)^{th}$-level optical switching devices in the M levels of optical switching devices is connected to at most two optical switching devices in $i^{th}$-level optical switching devices, and two optical switching devices that are in the $i^{th}$-level optical switching devices and that are connected to a same optical switching device in the $(i-1)^{th}$-level optical switching devices are connected, where 3≤i≤M. M, m, and i are integers.

Optionally, in an embodiment, as shown in FIG. 1, when the on-chip optical interconnection structure, that is, the mesh-tree structure, includes three levels of optical switching devices, that is, M=3, the $m^{th}$-level optical switching devices in the three levels of optical switching devices include $2^{m-1}$ optical switching devices, where 1≤m≤3. That is, the first-level optical switching device includes one optical switching device (101), the second-level optical switching devices include two optical switching devices (102 and 105), and the third-level optical switching devices include four optical switching devices (103, 104, 106, and 107). In addition, each optical switching device in the $(i-1)^{th}$-level optical switching devices is connected to two optical switching devices in the $i^{th}$-level optical switching devices, where 2≤i≤3. That is, the optical switching device 102 at the second level is separately connected to the optical switching devices 103 and 104 at the third level, and the optical switching device 105 at the second level is also separately connected to the optical switching devices 106 and 107. In addition, two third-level optical switching devices connected to a same second-level optical switching device are also connected. That is, the optical switching devices 103 and 104 are connected, and the optical switching devices 106 and 107 are connected.

In this embodiment of the present disclosure, optionally, the $m^{th}$ level includes at most $2^{m-1}$ optical switching devices. For example, the third level includes at most four optical switching devices (103, 104, 106, and 107). That is, the third level may include four or less optical switching devices. For example, the optical switching device 103 may not exist, and the optical switching device 102 is only connected to the optical switching device 104. The present disclosure is not limited thereto. Optionally, when the mesh-tree structure includes more than three levels of optical switching devices, for example, when the mesh-tree structure further includes fourth-level optical switching devices, optical switching devices at each level include at most $2^{m-1}$ optical switching devices. For example, the fourth level includes at most eight optical switching devices. The present disclosure is not limited thereto.

In this embodiment of the present disclosure, the on-chip optical interconnection structure including three levels of optical switching devices in FIG. 1 may be referred to as a three-level on-chip optical interconnection structure, that is, a three-level mesh-tree structure. Optionally, a mesh-tree structure including more than three levels of optical switching devices is referred to as a multilevel mesh-tree structure. For example, a mesh-tree structure including four levels of optical switching devices or a mesh-tree structure including five levels of optical switching devices belongs to the multilevel mesh-tree structure. The present disclosure is not limited thereto. For the multilevel mesh-tree structure, optical switching devices that are at bottom three levels and that are connected may be considered as multiple mesh-tree structures. For example, a five-level mesh-tree structure includes five levels of optical switching devices, and optical switching devices at the third, the fourth, and the fifth levels in the five-level mesh-tree structure may be considered as consisting of four three-level mesh-tree structures. In this case, one multilevel mesh-tree structure may be considered as an on-chip optical interconnection network consisting of multiple three-level mesh-tree structures and multiple additional optical switching devices. The additional optical switching devices herein are other optical switching devices except the three-level mesh-tree structures in the multilevel mesh-tree structure. For example, for a five-level mesh-tree structure, optical switching devices at the third, the fourth, and the fifth levels may be considered as consisting of four three-level mesh-tree structures. Three optical switching devices at the first and the second levels in the five-level mesh-tree structure are the additional optical switching devices. The five-level mesh-tree structure may be considered as an on-chip optical interconnection network that is formed by connecting the additional three optical switching devices and the four three-level mesh-tree structures.

Optionally, when the on-chip optical interconnection network includes multiple on-chip optical interconnection structures, on-chip optical interconnection structures may be connected to each other using an optical switching device at a root node, that is, the first-level optical switching devices in the on-chip optical interconnection structures are connected to each other. The on-chip optical interconnection structure herein may be a three-level mesh-tree structure, or may be a mesh-tree structure having more than three levels. The present disclosure is not limited thereto.

Figure 2A:
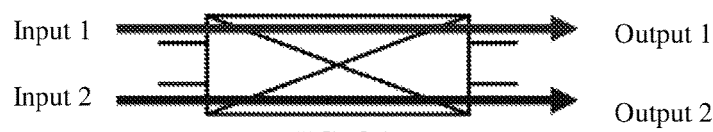
FIG. 2A and FIG. 2B are schematic diagrams of optical switching devices according to an embodiment of the present disclosure.
Figure 2B:

In this embodiment of the present disclosure, the on-chip optical interconnection structure uses all-optical switching. The all-optical switching is a process in which light is used as a medium in a data exchange process and properties of light are kept in the whole process without optical-electrical-optical conversion. Compared with electrical switching requiring the optical-electrical-optical conversion, the optical switching can provide a high bandwidth, save energy, and reduce a delay. A basic unit of the optical switching is an optical switching device, that is, an optical switch. That is, in this embodiment of the present disclosure, the optical switching device may be the optical switch. Using a basic unit 2×2 of a space optical switch as an example, as shown in FIGS. 2A and 2B, by means of electric control, light is input from an input end, and may be transmitted to different output ports in a bar (as shown in FIG. 2A) manner or in a cross (as shown in FIG. 2B) manner. An optical switching device with a larger quantity of ports is implemented by integrating multiple 2×2 switches, such as 4×4, 8×8, and 32×32. The rest can be obtained by analogy. However, the larger quantity of ports increases difficulty in implementation. How to increase expansibility without reducing the difficulty in implementing an architecture suitable for optical interconnection between computer components is the background of the technical solutions of the present disclosure. Relatively speaking, a 4×4 switch is a topology that is not difficult to implement currently and keeps a sufficient quantity of expanded ports. Therefore, in the present disclosure, effects are relatively good when the 4×4 switch is used as a basic unit. Optionally, for how to implement composition units in a 4×4 optical switching device, a silicon photonic MZI or silicon photonic microring technology may be used. That is, the optical switching device may be a microring resonant cavity structure or a MZI structure. The present disclosure is not limited thereto. However, power consumption of a microring-based optical switching device is low, but a bandwidth is not high currently, and there is relatively high temperature sensibility. An MZI optical switching device has a relatively high bandwidth, but compared with the microring-based optical switching device, a size is relatively large, and power consumption is relatively high. Therefore, a design depends on final application. The present disclosure may be implemented using any type of optical switching device.

In this embodiment of the present disclosure, for example, in FIG. 1, each optical switching device being a 4×4 optical switching device is used as an example, that is, each optical switching device has four transmission ports, including four input ends and four output ends. In the mesh-tree structure, the optical switching device 101 at the first level is separately connected to the optical switching devices 102 and 105 at the second level, the optical switching device 102 at the second level is connected to two optical switching devices 103 and 104 at the third level, and the two optical switching devices 103 and 104 at the third level are also connected to each other. Similarly, the optical switching device 105 at the second level is connected to two optical switching devices 106 and 107 at the third level, and the two optical switching devices 106 and 107 at the third level are also connected to each other. That is, the optical switching devices 102, 103, and 104 form a full-mesh structure, and the optical switching devices 105, 106, and 107 also form a full-mesh structure. For the optical switching devices in the mesh-tree structure, in addition to the connection between optical switching devices, other ports of the optical switching devices may be connected to multiple computer components. Optionally, in FIG. 1, the other ports may be connected to 12 computer components (108 to 119). The 12 computer components may all be in a same on-chip optical interconnection network with the mesh-tree structure, or may be partially in a same on-chip optical interconnection network with the mesh-tree structure, and the other part belong to a structure on another chip. The present disclosure is not limited thereto.

It should be appreciated that, in this embodiment of the present disclosure, each optical switching device includes multiple transmission ports. For example, a 4×4 optical switching device includes four transmission ports, and the transmission ports may be used to perform input and output. Optionally, each transmission port may separately include one output end and one output end. Connection between one optical switching device and another optical switching device means that transmission ports of the two optical switching devices are connected such that input and output may be performed. That is, the two optical switching devices are connected using input ends and output ends. For example, as shown in FIG. 1, the optical switching device 102 is connected to the optical switching device 103, and each of the optical switching devices 102 and 103 includes four output ends and four input ends. That is, an output end of the optical switching device 102 is connected to an input end of the optical switching device 103, and an input end of the optical switching device 102 is connected to an output end of the optical switching device 103 such that mutual transmission may be performed between the optical switching device 102 and the optical switching device 103. Similarly, a connection between an optical switching device and a computer component also means that transmission ports of the optical switching device and the computer component are connected. The optical switching device and the computer component may be connected using input ends and output ends. For example, as shown in FIG. 1, the optical switching device 102 is connected to a computer component 110. That is, an output end of the optical switching device 102 is connected to an input end of the computer component 110, and an input end of the optical switching device 102 is connected to an output end of the computer component 110 such that mutual transmission may be performed between the optical switching device 102 and the computer component 110.

Optionally, in this embodiment of the present disclosure, the optical switching device herein may be an optical switching device, and each optical switching device may be n×n, that is, including n transmission ports, n input ends and n output ends may be included. For example, the optical switching device may be 4×4, or may be 8×8, that is, the optical switching device has eight input ends and eight output ends. In this case, a connection manner shown in FIG. 1 is still used. Because quantities of input ends and output ends of each optical switching device are increased, the mesh-tree structure may be connected to more computer components. Optionally, the connection manner shown in FIG. 1 may be not used. For example, when two optical switching devices are connected, it may indicate that two input and two output ends are connected. For example, two 8×8 optical switching devices 102 and 103 are connected. That is, two output ends of the optical switching device 102 are separately connected to two input ends of the optical switching device 103, and two input ends of the optical switching device 102 are connected to two output ends of the optical switching device 103 such that mutual transmission may be performed between the optical switching device 102 and the optical switching device 103. Similarly, this manner is also used for a connection between the optical switching device and the computer component. In this case, although the quantities of the input/out ends of each optical switching device are increased, compared with FIG. 1, although a quantity of the computer components to which the mesh-tree structure can be connected is unchanged, a speed of transmission between optical switching devices and a speed of transmission between an optical switching device and a computer component are increased.

In this embodiment of the present disclosure, for computer components 108 to 119, some components may be vacant. Multiple transmission ports in the mesh-tree structure may be connected to the computer components 108 to 119. One transmission port may include one input end and one output end. Multiple transmission ports of the mesh-tree structure may be connected to multiple computer components. However, when a quantity of computer components 108 to 119 to which the mesh-tree structure needs to be connected is relatively small, some transmission ports in the mesh-tree structure may be vacant. For example, as shown in FIG. 1, when the mesh-tree structure needs to be connected to only two processors, the corresponding computer component 110 may be connected to one transmission port of the optical switching device 102, and the corresponding computer component 111 may be connected to one transmission port of the optical switching device 105. That is, 110 and 111 represent processors, and the rest 108, 109, and 112 to 119 are vacant and not connected to any element.

In this embodiment of the present disclosure, because a quantity of cores in computer components is gradually increased in future, the cores are classified into large cores and small cores, and a large core and a small core may coexist. The large core has relatively strong computing power, but the small core has a high-speed parallel access rate. For different scenarios, large cores and small cores are properly used to perform collaborative computing. For the mesh-tree structure of the present disclosure, a large-core central processing unit (CPU) may be connected to the optical switching device 101, that is, the large-core CPU is connected to a root node of the mesh-tree structure, and is responsible for high-speed computation and task distribution. However, small cores are connected to leaf nodes other than the root node in order to increase a computation speed. However, the present disclosure is not limited thereto.

Figure 3:
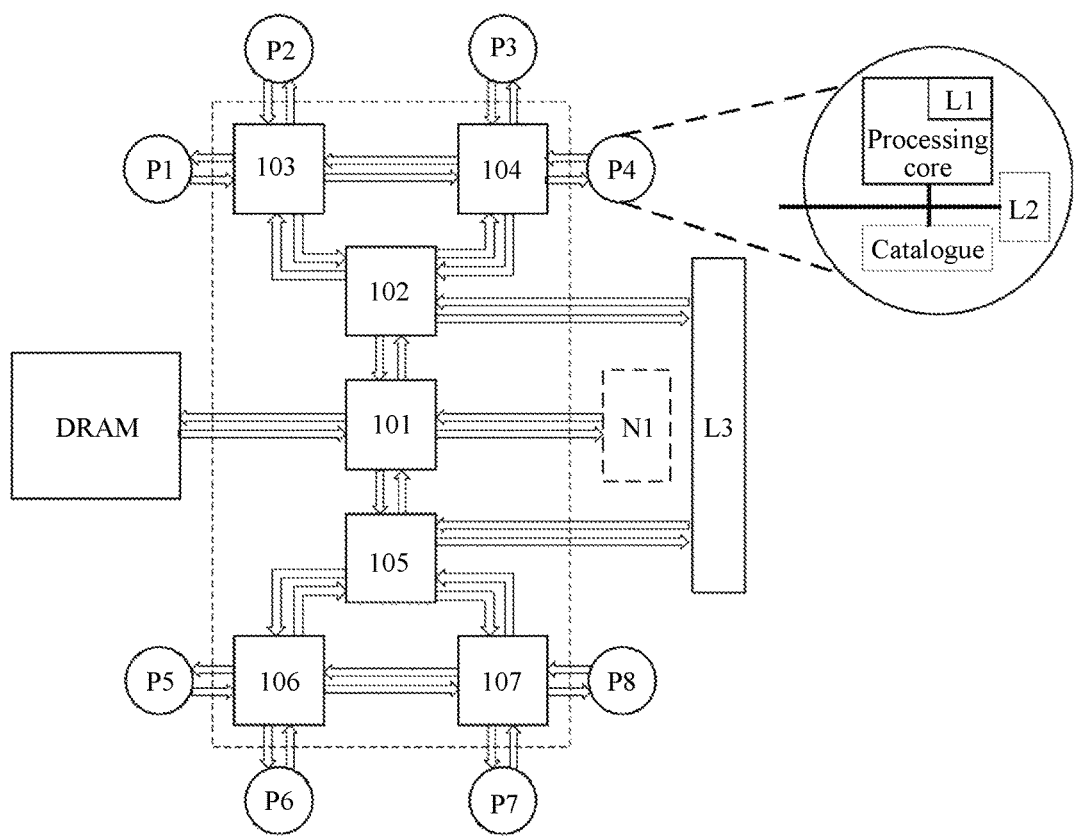
FIG. 3 is another schematic diagram of an on-chip optical interconnection network according to an embodiment of the present disclosure.

In this embodiment of the present disclosure, using FIG. 3 as an example, if the on-chip optical interconnection network includes multiple mesh-tree structures, the mesh-tree structures may be connected to each other using a root node of each mesh-tree structure, that is, the optical switching device 101. That is, an optical switching device in FIG. 3 is connected to N1. N1 represents an optical switching device of a root node of another mesh-tree structure. The optical switching devices of the mesh-tree structures may be connected to form a daisy chain. The present disclosure is not limited thereto. However, for each mesh-tree structure, as shown in FIG. 3, the optical switching devices 103, 104, 106, and 107 may be separately connected to eight computer components (designated as P1 to P8). The eight computer components may be processor nodes, that is, P1 to P8 are eight processors. A structure of each processor node may be shown in a circle near P4. Each processor may include one processing core, catalogue, and may include caches represented by L1 and L2. The mesh-tree structure may be a mirror optical interconnection structure, that is, a connection of ports P5 to P8 copies a connection form of P1 to P4. The present disclosure is not limited thereto.

In addition, in this embodiment of the present disclosure, using FIG. 3 as an example, the root node of each mesh-tree structure, that is, the optical switching device 101, may further be connected to an external dynamic random access memory (DRAM). When the on-chip optical interconnection network includes only one mesh-tree structure, the root node, that is, the optical switching device 101, may be connected to two memories. The memories may be internal memories, or may be external memories. The present disclosure is not limited thereto.

In this embodiment of the present disclosure, using FIG. 3 as an example, the second-level optical switching devices of each mesh-tree structure, that is, the optical switching devices 102 and 105, may be connected to an L3 cache, that is, the second-level optical switching devices are connected to a same computer component. However, the present disclosure is not limited thereto.

Figure 4:
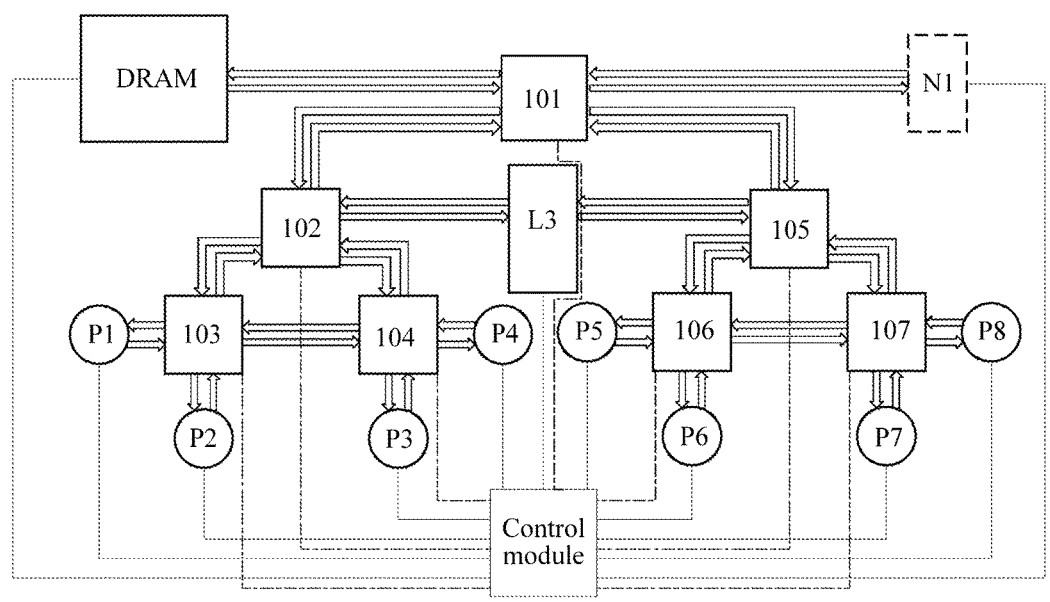
FIG. 4 is still another schematic diagram of an on-chip optical interconnection network according to an embodiment of the present disclosure.

In this embodiment of the present disclosure, as shown in FIG. 4, which is based on FIG. 3, the on-chip optical interconnection network may further include a control module. Because each optical switching device needs to be controlled using a control signal, the control signal may be from the control module. Optionally, the control module may be a routing chip. The routing chip is connected to all computer components and optical switching devices to implement arbitration of a routing status of each optical switching device. This is greatly different from exchange in a conventional communication scenario. In conventional communication, each switch has an independent arbitration capability. In the present disclosure, the optical switching devices have no independent determination capabilities. It can be seen from FIG. 4 that all computer components and optical switching devices are connected to the routing chip, and the routing chip determines, by means of arbitration, statuses of the optical switching devices according to information obtained from the computer components.

Optionally, each optical switching device in the on-chip optical interconnection network, may also include functions of the routing chip, that is, the on-chip optical interconnection network may not include a separate routing chip. Instead, each optical switching device has a control module, has a routing function, and may control an on-off status of the optical switching device according to information obtained from the computer components. The present disclosure is not limited thereto.

Figure 5:
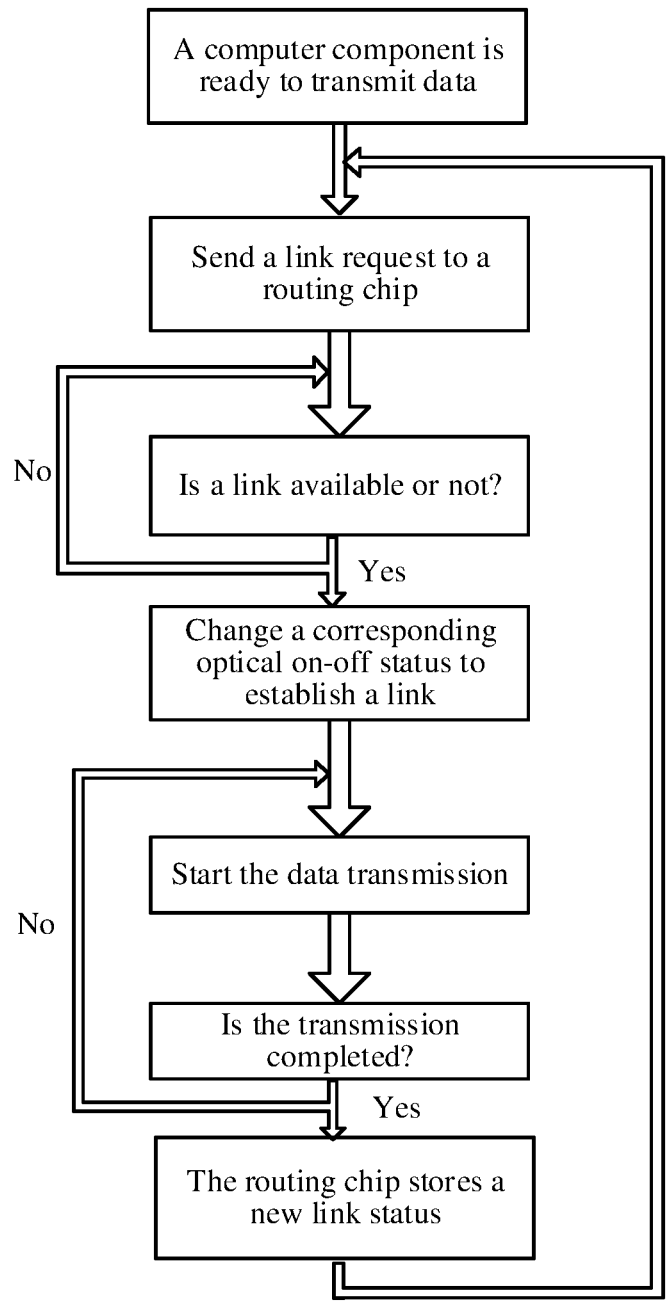
FIG. 5 is a schematic flowchart of a transmission method of an on-chip optical interconnection network according to an embodiment of the present disclosure.

In an embodiment of the present disclosure, FIG. 5 is a schematic flowchart of a transmission process of an on-chip optical interconnection network according to this embodiment of the present disclosure. As shown in FIG. 5, for the on-chip optical interconnection network shown in FIG. 4, when a computer component is ready to transmit data, the computer component may send a request message (i.e., a link request) to a control module. The control module may be a routing chip. The routing chip may determine a link for the data transmission according to the request message, and control a status of each optical switching device such that the transmission link is available. According to control signals of the routing chip, each optical switching device may change its own status, and starts transmitting data. After data transmission is completed, the routing chip may store a new link status.

In this embodiment of the present disclosure, using the on-chip optical interconnection network including the routing chip as an example, for example, as shown in FIG. 4, when an optical signal needs to be transmitted between the processors P3 and P6, the routing chip may determine, according to information received from the processors P3 and P6, that the optical signal is transmitted using the optical switching devices 104, 102, 101, 105, and 106. The optical signal may be sent from the processor P3 to the optical switching device 104, the optical switching device 104 may finally transmit the optical signal to the optical switching device 106 using the optical switching devices 102, 101, and 105, and the optical switching device 106 sends the optical signal to the processor P6. Optionally, when each optical switching device in the on-chip optical interconnection network has a routing function, the on-chip optical interconnection network may not include a separate routing chip, and each optical switching device may make a determination and performs the foregoing process. Therefore, hierarchical switching may be performed between the optical switching devices of each mesh-tree structure in the on-chip optical interconnection network provided in this embodiment of the present disclosure in order to reduce conflicts and delays in communication.

In this embodiment of the present disclosure, for another example, as shown in FIG. 4, when an optical signal needs to be transmitted between the processors P2 and P3, the routing chip may determine, according to information received from the processors P2 and P3, that the optical signal is transmitted using the optical switching devices 103 and 104. The optical signal may be sent from the processor P2 to the optical switching device 103, and is further sent by 103 to the optical switching device 104. Optionally, when each optical switching device in the on-chip optical interconnection network has a routing function, the on-chip optical interconnection network may not include a separate routing chip, and each optical switching device may make a determination and performs the foregoing process. Therefore, a grid connection may be formed between optical switching devices (for example, the optical switching devices 103 and 104) at each level of each mesh-tree structure in the on-chip optical interconnection network provided in this embodiment of the present disclosure. When a signal is transmitted, the optical signal may be transmitted without using an upper-level optical switching device (for example, the optical switching device 102) such that faster and more effective communication between processors may be implemented.

Therefore, the on-chip optical interconnection network provided in this embodiment of the present disclosure includes at least one on-chip optical interconnection structure. The on-chip optical interconnection structure may be a mesh-tree structure. Each mesh-tree structure includes multiple levels of optical switching devices, and two lower-level optical switching devices connected to a same upper-level optical switching device are also connected. Compared with conventional optoelectronic switching, all-optical switching of the on-chip optical interconnection network may reduce power consumption. The on-chip optical interconnection network is divided into levels, and optical switching devices connected in a grid manner are formed such that hierarchical switching may be performed, and conflicts and delays in communication are reduced. In addition, optical switching devices at a bottom layer of the mesh-tree structure allow faster and more effective communication between computer components without accessing an optical switching device at a higher layer. An optical switching device at a top layer of the mesh-tree structure may enable different types of computer components to connect to more modules in a more flexible manner without interrupting data transmission between other layers.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An on-chip optical interconnection structure, comprising M levels of optical switches, wherein $m^{th}$-level optical switches in the M levels of optical switches comprise $2^{m-1}$ optical switches, wherein each optical switch in $(i-1)^{th}$-level optical switches in the M levels of optical switches is coupled to two optical switches in $i^{th}$-level optical switches, wherein two optical switches in the $i^{th}$-level optical switches coupled to a same optical switch in the $(i-1)^{th}$-level optical switches are coupled, wherein M, m, and i are integers, wherein M≥3, wherein 1≤m≤M, and wherein 3≤i≤M.

2. The on-chip optical interconnection structure according to claim 1, wherein at least one optical switch in the M levels of optical switches is coupled to a computer component using a transmission port.

3. The on-chip optical interconnection structure according to claim 2, further comprising a routing chip coupled to each optical switch in the on-chip optical interconnection structure and configured to control a status of the each optical switch in the on-chip optical interconnection structure according to information obtained from the computer component.

4. The on-chip optical interconnection structure according to claim 1, wherein a structure of each optical switch in the on-chip optical interconnection structure comprises a microring resonant cavity structure.

5. The on-chip optical interconnection structure according to claim 1, wherein a structure of each optical switch in the on-chip optical interconnection structure comprises a Mach Zehnder interferometer (MZI) structure.

6. The on-chip optical interconnection structure according to claim 2, wherein M=3, wherein each optical switch in the on-chip optical interconnection structure comprises four transmission ports, and wherein at least one of the four transmission ports of each optical switch is coupled to the computer component.

7. The on-chip optical interconnection structure according to claim 2, wherein M=3, wherein each optical switch in the on-chip optical interconnection structure comprises four transmission ports, and wherein at least one of the four transmission ports of each optical switch is coupled to another optical switch.

8. An on-chip optical interconnection network, comprising at least one on-chip optical interconnection structure, wherein each of the at least one on-chip optical interconnection structure comprises M levels of optical switches, wherein $m^{th}$-level optical switches in the M levels of optical switches comprise $2^{m-1}$ optical switches, wherein each optical switch in $(i-1)^{th}$-level optical switches in the M levels of optical switches is coupled to two optical switches in $i^{th}$-level optical switches, wherein two optical switches in the $i^{th}$-level optical switches coupled to a same optical switch in the $(i-1)^{th}$-level optical switches are coupled, wherein M, m, and i are integers, wherein M≥3, wherein 1≤m≤M, and wherein 3≤i≤M.

9. The on-chip optical interconnection network according to claim 8, wherein when the on-chip optical interconnection network comprises at least two on-chip optical interconnection structures, the at least two on-chip optical interconnection structures are coupled to each other using a first-level optical switch in each of the at least two on-chip optical interconnection structures.

10. The on-chip optical interconnection network according to claim 8, wherein at least one optical switch in the M levels of optical switches is coupled to a computer component using a transmission port.

11. The on-chip optical interconnection network according to claim 10, wherein the at least one on-chip optical interconnection structure further comprises a routing chip coupled to each optical switch in the at least one on-chip optical interconnection structure, and wherein the routing chip is configured to control a status of the each optical switch in the at least one on-chip optical interconnection structure according to information obtained from the computer component.

12. The on-chip optical interconnection network according to claim 8, wherein a structure of each optical switch in the at least one on-chip optical interconnection structure comprises a microring resonant cavity structure.

13. The on-chip optical interconnection network according to claim 8, wherein a structure of each optical switch in the at least one on-chip optical interconnection structure comprises a Mach Zehnder interferometer (MZI) structure.

14. The on-chip optical interconnection network according to claim 10, wherein M=3, each optical switch in the at least one on-chip optical interconnection structure comprises four transmission ports, and wherein at least one of the four transmission ports of each optical switch is coupled to the computer component.

15. The on-chip optical interconnection network according to claim 10, wherein M=3, wherein each optical switch in the at least one on-chip optical interconnection structure comprises four transmission ports, and wherein at least one of the four transmission ports of each optical switch is coupled to another optical switch.

* * * * *